(12) United States Patent
Ouyang

(10) Patent No.: US 7,269,007 B2
(45) Date of Patent: Sep. 11, 2007

(54) MAGNETO-HYDRODYNAMIC HEAT SINK

(75) Inventor: Chien Ouyang, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 24 days.

(21) Appl. No.: 11/219,965

(22) Filed: Sep. 6, 2005

(65) Prior Publication Data
US 2007/0053153 A1 Mar. 8, 2007

(51) Int. Cl.
*G06F 1/16* (2006.01)
(52) U.S. Cl. .................. 361/687; 165/104.33; 62/435
(58) Field of Classification Search ........... 165/104.33, 165/80.4; 62/435, 3.7; 361/699, 752, 679–687, 361/724–727; 219/490
See application file for complete search history.

(56) References Cited

U.S. PATENT DOCUMENTS

| | | | |
|---|---|---|---|
| 5,355,942 A | | 10/1994 | Conte |
| 5,432,526 A | * | 7/1995 | Hyatt ........................ 345/87 |
| 2004/0042184 A1 | * | 3/2004 | Tomioka ..................... 361/752 |
| 2005/0045621 A1 | * | 3/2005 | Chenier et al. ............. 219/490 |
| 2006/0169440 A1 | * | 8/2006 | Chou et al. .............. 165/104.33 |

OTHER PUBLICATIONS

High-Performance Liquid Metal Cooling Loops, Authors: U. Ghoshal, D. Grimm, S. Ibrani, C. Johnston, and A. Miner , nanoCoolers, Inc., as published in the 21st IEEE Semi-Therm Symposium, Sep. 2005; 4 pages.

Free Surface Heat Transfer and Innovative Designs for Thin and Thick Liquid Walls, Authors: A.Y. Ying, N. Morley, S. Smolentsev, K. Gulec, and P. Fogarty, Mechanical & Aerospace Engineering Department, UCLA, Los Angeles, CA 90095 Draft copy submitted to ISFNT-5, Rome Sep. 1999; pp. 1-8.

\* cited by examiner

*Primary Examiner*—Hung Van Duong
(74) *Attorney, Agent, or Firm*—Osha Liang LLP

(57) ABSTRACT

A heat sink uses a pump assembly to generate a magnetic field. Flow directions of electrically and thermally conductive liquid flowing through multiple pipes that go through the pump assembly are dependent on an orientation of the magnetic field and/or the direction of electrical current induced across flowing fluid in the magnetic field. In such a manner, cool liquid may be directed toward a heat source and warmer liquid may be directed to flow away from the heat source, where heat transfer occurs between the liquid and the heat sink. Additional pump assemblies that generate separate magnetic fields may be used to increase fluid flow volume, thereby increasing heat transfer away from the heat source.

20 Claims, 11 Drawing Sheets

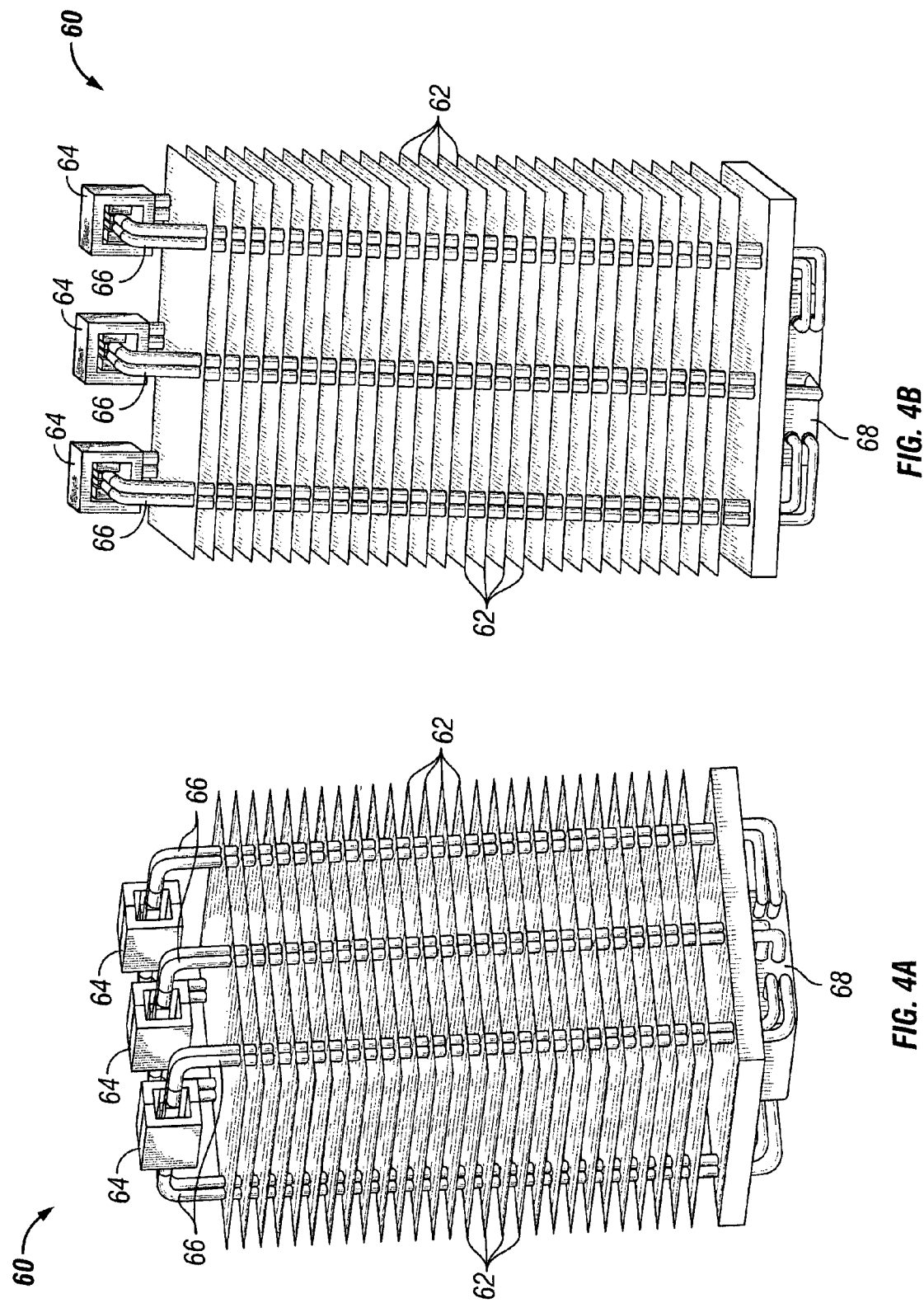

MAGNETO-HYDRODYNAMIC HEAT SINK

CROSS-REFERENCE TO RELATED APPLICATIONS

The present application contains subject matter that may be related to the subject matter in the following U.S. applications filed on Sep. 6, 2005 and assigned to the assignee of the present application: "Magneto-Hydrodynamic Heat Sink" (Ser. No. 11/220,177); and "Magneto-Hydrodynamic Heat Sink" (Ser. No. 11/219,964).

BACKGROUND

A computer system 10, as shown in FIG. 1, includes several components that are collectively used by a user to perform various functions such as, for example, preparing and generating a document with a word processor application. With the computer system 10, the user may input data to a computing portion 12 using peripheral devices such as a keyboard 14 or a mouse 16. Data may also be provided to the computing portion 12 using data storage media (e.g., a floppy disk or a CD-ROM (not shown)). The computing portion 12, using memory and other internal components, processes both internal data and data provided to the computing portion 12 by the user to generate data requested by the user. The generated data may be provided to the user via, for example, a display device 18 or a printer 20. The computing portion 12 of a computer system typically includes various components such as, for example, a power supply, disk drives, and the electrical circuitry required to perform the necessary and requested operations of the computer system.

As shown in FIG. 2, the computing portion 12 may contain a plurality of circuit boards 22, 24, 26, 28 (e.g., printed circuit boards (PCBs) or printed wiring boards (PWBs)) on which various circuit components are implemented. For example, a computing portion designed to have enhanced sound reproducing capabilities may have a circuit board dedicated to implementing circuitry that specifically operate to process data associated with the reproduction of sound.

In FIG. 2, the components of exemplary circuit board 22 are shown. A crystal oscillator 30 provides a reference of time to various integrated circuits (ICs) 32, 34, 36, 38, 40, 42 (e.g., application specific integrated circuits (ASICs), field-programmable gate arrays (FPGAs), microprocessors, logic gates) that are connected to the circuit board 22. The integrated circuits 32, 34, 36, 38, 40, 42 communicate with one another, i.e., pass data, using wires or traces of conductive material (e.g., copper (shown, but not labeled)) embedded in the circuit board 22.

In operation, an integrated circuit, such as those shown in FIG. 2, dissipates heat as a result of work performed by the integrated circuit. Energy that is needed by the integrated circuit for work is not consumed with 100% efficiency, thereby resulting in excess energy that is released, among other things, as heat. As integrated circuits become more dense (i.e., more transistors per unit area) and faster (i.e., higher operating frequencies), they generate more heat. As excessive heat is damaging to an integrated circuit both in terms of performance and component integrity, an important design consideration involves ensuring that heat dissipated by an integrated circuit is sufficiently drawn away from the integrated circuit, where the efficiency of drawing away heat from the integrated circuit is expressed in terms of what is referred to as the "heat transfer rate."

"Heat sinks" are devices that are commonly used to cool integrated circuits. FIG. 3 shows a heat sink 50 as used with an integrated circuit 52 housed in a package 54 atop a substrate 56. The heat sink 50 is made of a high thermal conductivity metal (e.g., copper or aluminum). A "high thermal conductivity metal" is one that allows heat to pass through it because it contains many free electrons.

A base of the heat sink 50 is secured over the integrated circuit 52 by, for example, a retention clip (not shown) or an adhesive or thermal interface material (shown, but not labeled). During operation of the integrated circuit 52, the temperature of the integrated circuit 52 increases due to increased particle movement resulting from a build-up of excess energy. The increased integrated circuit temperature results in an increase in the temperature of the package 54, and consequently, of the heat sink 50. The increased temperature of the heat sink 50 results in an increase in the temperature of the air around the heat sink 50, whereby the heated air rises and effectively draws heat away from the integrated circuit 52. This process is referred to as "convection."

The removal of heat dissipated from an integrated circuit by a heat sink is dependent on numerous factors. For example, the thermal resistance of the package that houses the integrated circuit affects how much heat transfers from the integrated circuit to the heat sink. Also, the effectiveness of the adhesives between the integrated circuit and its package and the package and the heat sink affects how much heat transfers between these components. Moreover, the conductivity of the materials used in the package and the heat sink has a direct bearing on the amount of heat that is transferred away from the integrated circuit. The surface area of the heat sink is also important as more surface area results in more air being heated, thereby resulting in more heat being drawn away from the integrated circuit by the rising heated air.

SUMMARY

According to one aspect of one or more embodiments of the present invention, a computer system comprises an integrated circuit and a heat sink operatively connected to the integrated circuit, where the heat sink comprises: a first pipe arranged to carry thermally and electrically conductive fluid through the heat sink; a second pipe arranged to carry the fluid through the heat sink; and a pump assembly arranged to house at least a portion of each of the first pipe and the second pipe, where a direction of fluid flow in the first pipe and a direction of fluid flow in the second pipe is dependent on electrical current induced through a magnetic field having the same direction across the at least a portion of each of the first pipe and the second pipe.

According to another aspect of one or more embodiments of the present invention, a method of cooling an integrated circuit with a heat sink comprises: generating a magnetic field; propagating thermally and electrically conductive fluid through the heat sink and the magnetic field with a first pipe; propagating the fluid through the heat sink and the magnetic field with a second pipe; and inducing electrical current through the magnetic field, where a direction of the magnetic field is the same across fluid in at least a portion of each of the first pipe and the second pipe, and where a direction of fluid flow in the first pipe and a direction of fluid flow in the second pipe is dependent on the inducing and the generating.

According to another aspect of one or more embodiments of the present invention, a heat sink comprises: a body having a plurality of fins arranged to dissipate heat; a pump assembly disposed over a top surface of the body, the pump assembly arranged to generate a magnetic field; a first pipe arranged to carry thermally and electrically conductive fluid through the heat sink, a portion of the first pipe being partially housed in the pump assembly; a second pipe arranged to carry the fluid through the heat sink, a portion of the second pipe being partially housed in the pump assembly, where a direction of the magnetic field is the same across the portion of the first pipe and the portion of the second pipe; and a heat exchanger assembly disposed along a bottom surface of the body, the heat exchanger assembly being operatively connected to the first pipe and the second pipe.

Other aspects and advantages of the invention will be apparent from the following description and the appended claims.

BRIEF DESCRIPTION OF DRAWINGS

FIG. 4A shows a side view of a heat sink in accordance with an embodiment of the present invention.

FIG. 4B shows a side view of a heat sink in accordance with an embodiment of the present invention.

DETAILED DESCRIPTION

Embodiments of the present invention relate to a heat sink that "cools" an integrated circuit using flowing fluid that carries heat away from the integrated circuit. The heat sink uses a plurality of pump assemblies that generate magnetic fields to drive fluid flow. Accordingly, such a heat sink is referred to herein as a "magneto-hydrodynamic" heat sink.

FIG. 4A shows a side view of an exemplary heat sink 60 in accordance with an embodiment of the present invention. The heat sink 60 has a number of "fins" 62 that increase the amount of surface area of the heat sink 60 that is exposed to the outside air, thereby resulting in increased heat exchange between the heat sink 60 and the outside air. Pump assemblies 64 (further described below with reference to FIGS. 5-9) are disposed along a top side of the heat sink 60.

Pipes 66 go through the pump assemblies 64. In an embodiment of the present invention, each pipe 66 is formed of two pipes bonded together. Further, as more clearly shown in FIGS. 4B and 4C, pipes 66 go through and may be integral with the heat sink 60. In one or more embodiments of the present invention, the two pipes that make up each pipe 66 may be formed of copper. Further, in one or more embodiments of the present invention, the two pipes that make up each pipe 66 may be at least partially electrically non-conductive.

Figure 4C:
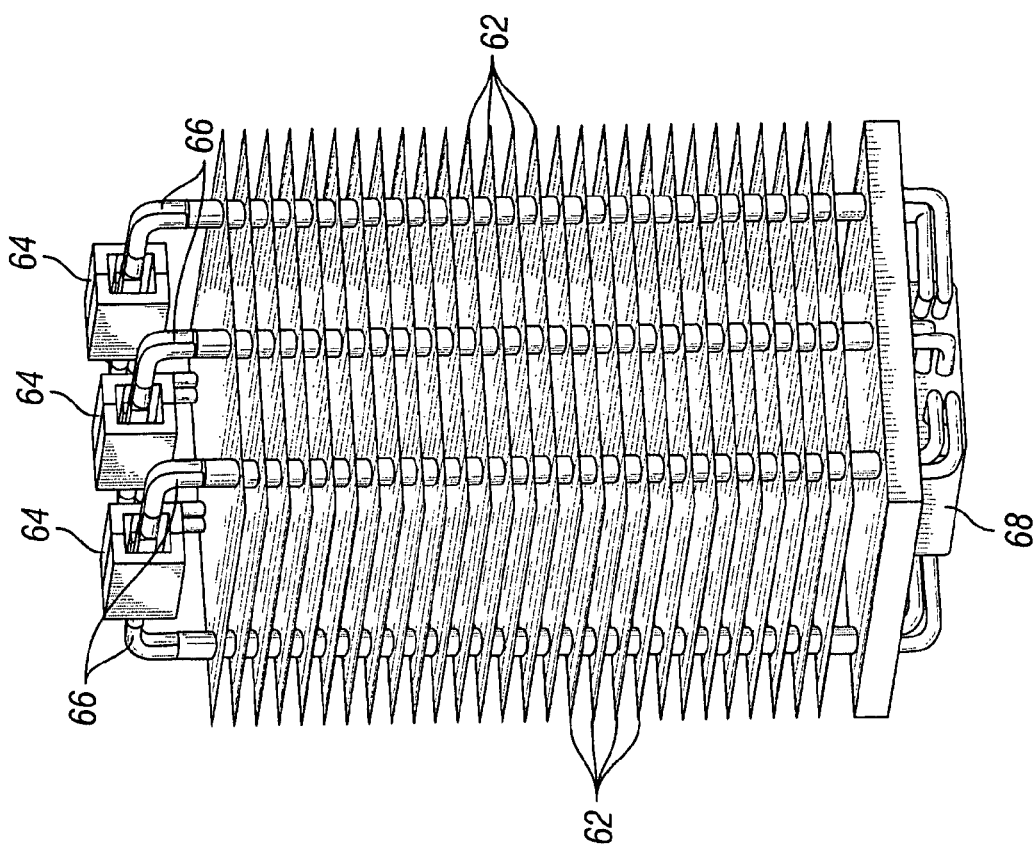
FIG. 4C shows a side view of a heat sink in accordance with an embodiment of the present invention.

As shown in FIGS. 4A, 4B, and 4C, a heat exchanger assembly 68 (further described below with reference to FIGS. 10-12) is disposed along a bottom side of the heat sink 60. Pipes 66 are arranged to connect to the heat exchanger assembly 68. The heat exchanger assembly 68 is arranged to attach to a heat source, such as, for example, an integrated circuit (not shown).

In one or more embodiments of the present invention, a heat sink may have a different fin configuration than that shown in FIGS. 4A, 4B, and 4C. Further, those skilled in the art will note that the heat sink 60 shown in FIGS. 4A, 4B, and 4C is not necessarily to scale and is not limited to a particular length, width, and/or height.

Further, although the heat sink 60 shown in FIGS. 4A, 4B, and 4C has three pump assemblies 64, in one or more other embodiments of the present invention, a different number of pump assemblies may be used. Further, in one or more embodiments of the present invention, pipes 66 may be formed of one or three or more pipes bonded together.

Figure 1:
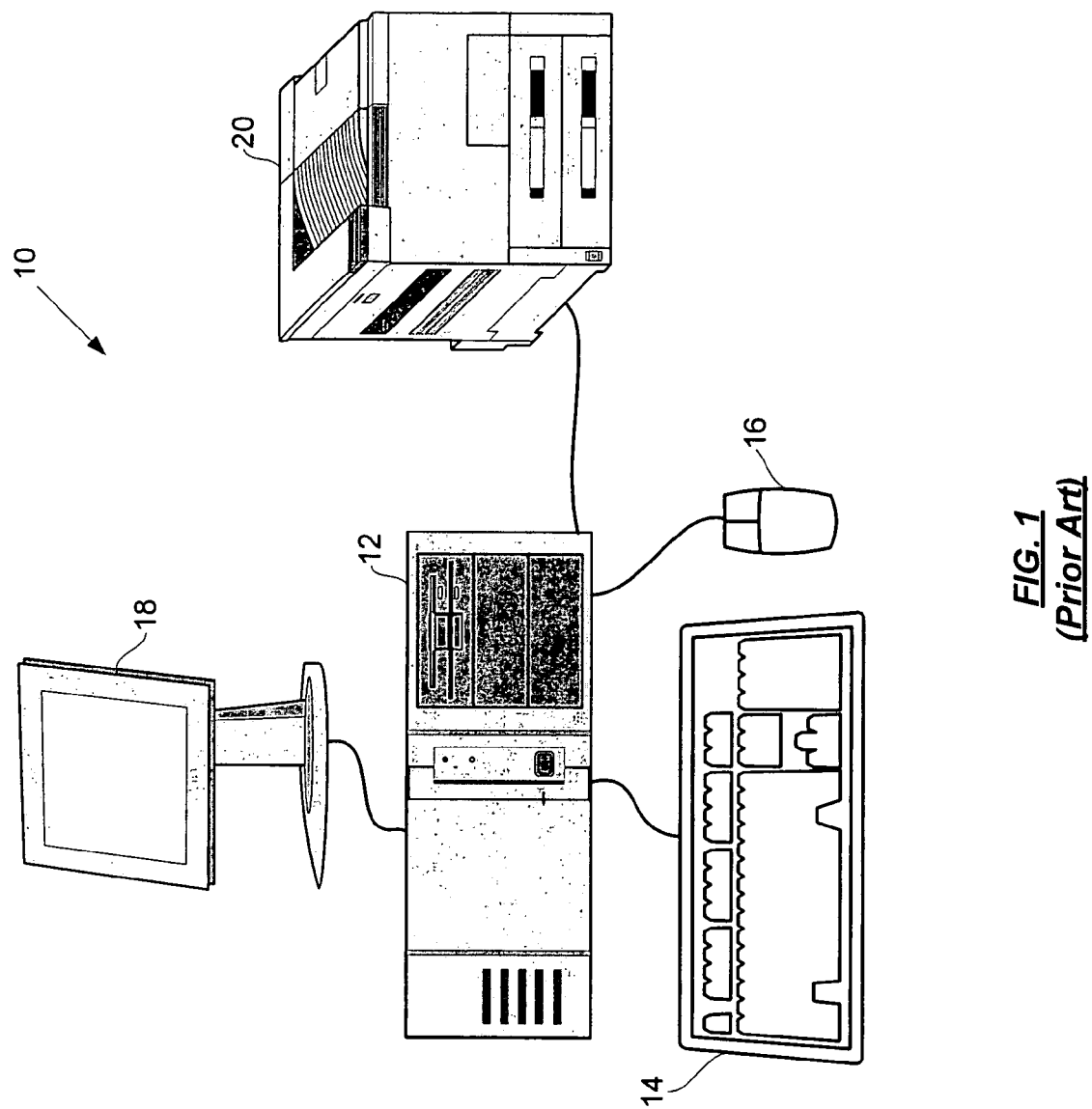
FIG. 1 shows a computer system.
Figure 2:
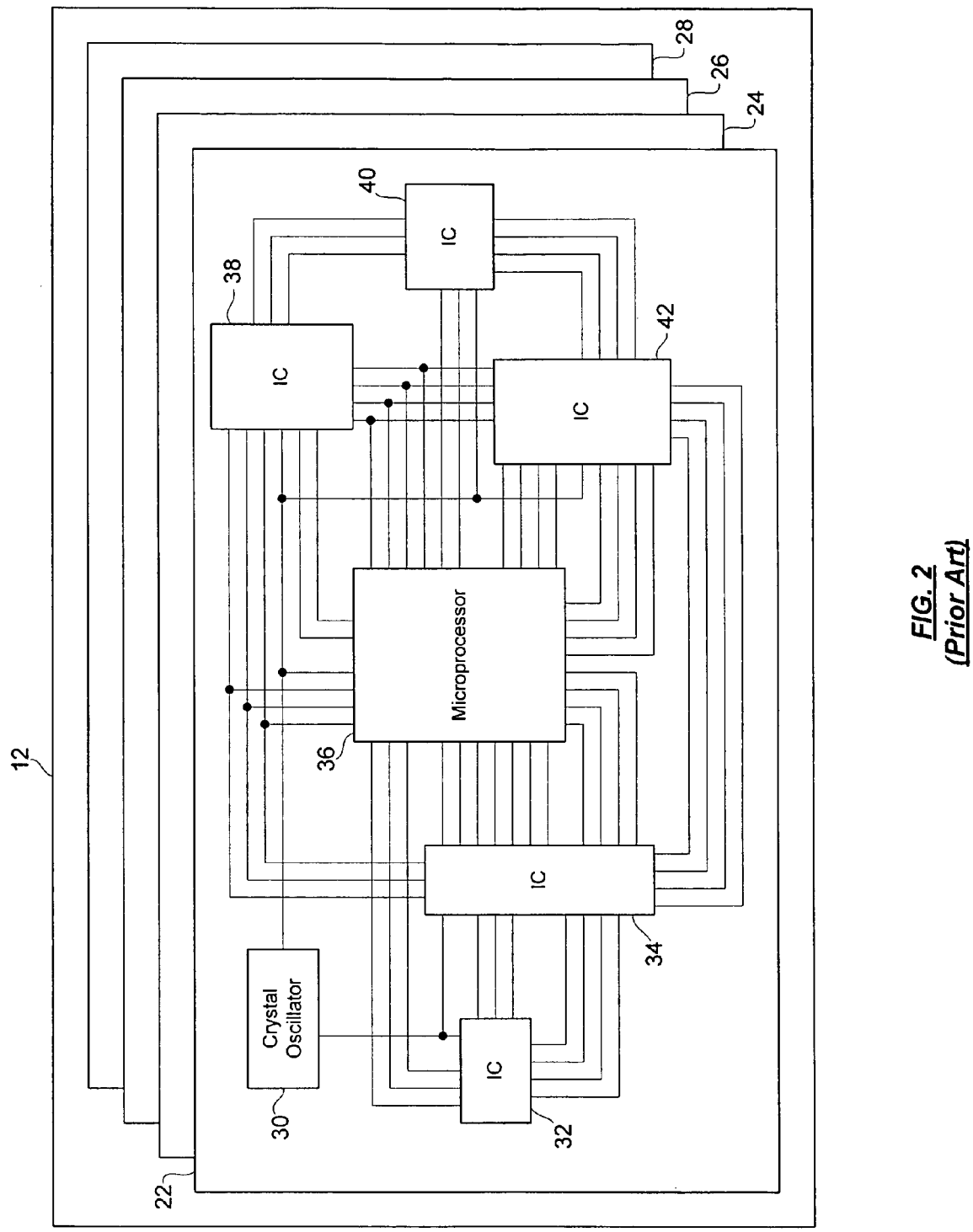
FIG. 2 shows a portion of a computer system.
Figure 3:
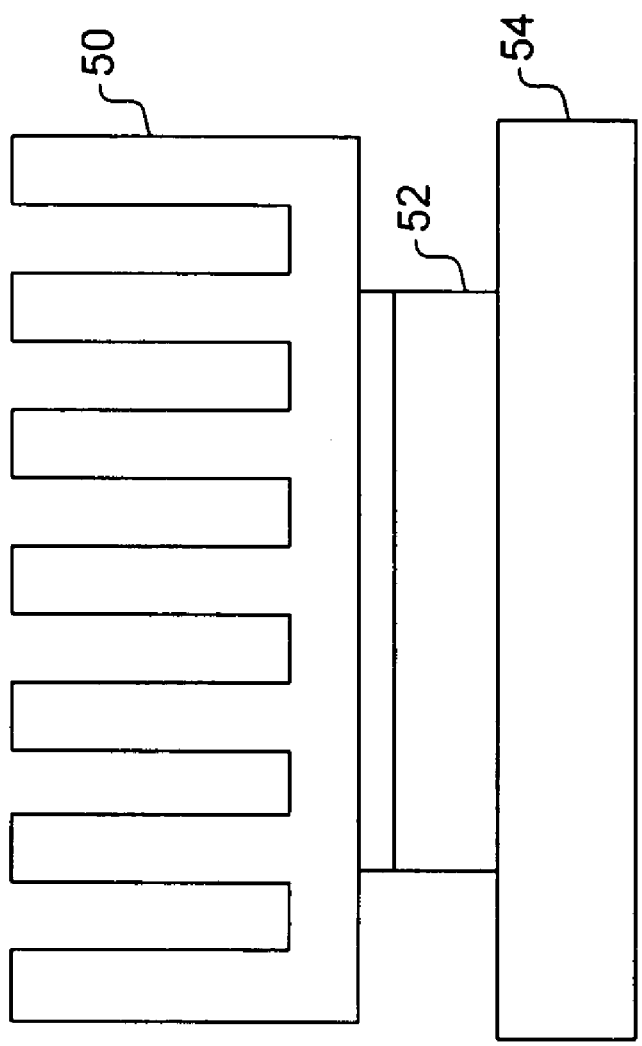
FIG. 3 shows a heat sink as used with an integrated circuit.
Figure 5:
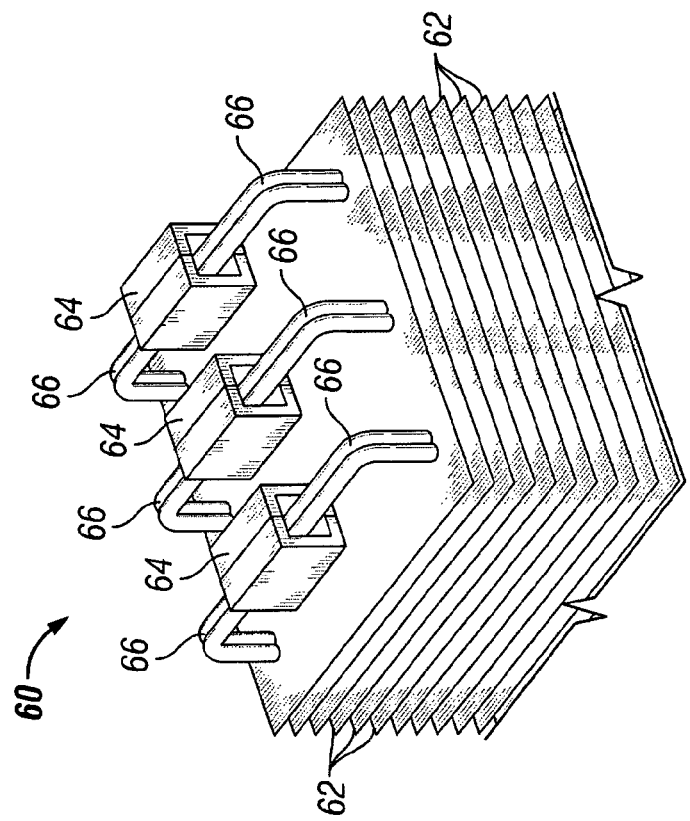
FIG. 5 shows a top view of a heat sink in accordance with an embodiment of the present invention.

FIG. 5 shows a top view of heat sink 60 in accordance with an embodiment of the present invention. A plurality of pump assemblies 64 (further described below with reference to FIGS. 6-9) are disposed along a top side of the heat sink 60. Pipes 66, which are each formed of two pipes bonded together, each go through one of the pump assemblies 64.

As shown in FIG. 5, the pump assemblies 64 are rectangular in shape. However, in one or more other embodiments of the present invention, one or more of the pump assemblies 64 may be of a different shape or geometry.

Figure 6A:
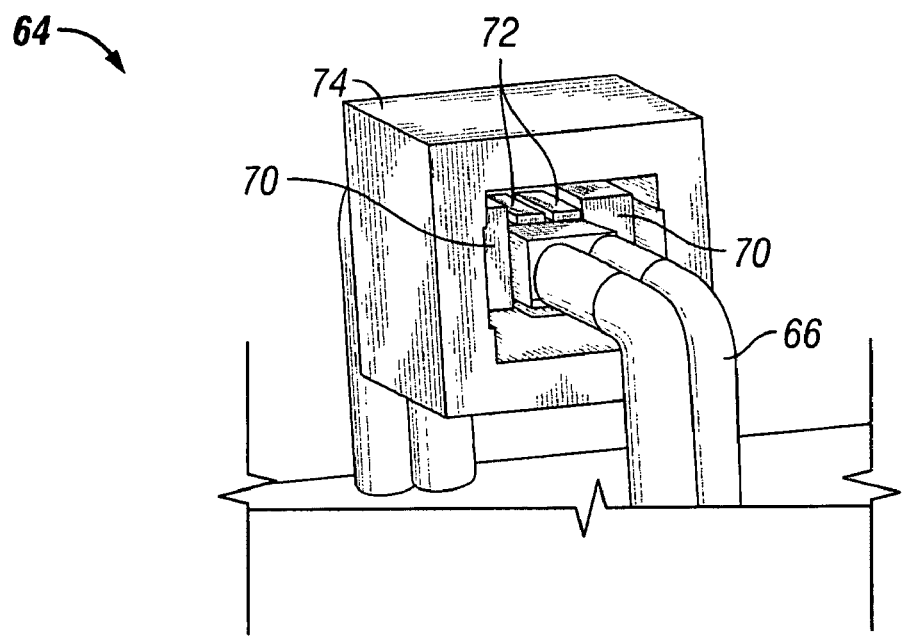
FIG. 6A shows a portion of a heat sink in accordance with an embodiment of the present invention.
Figure 6B:
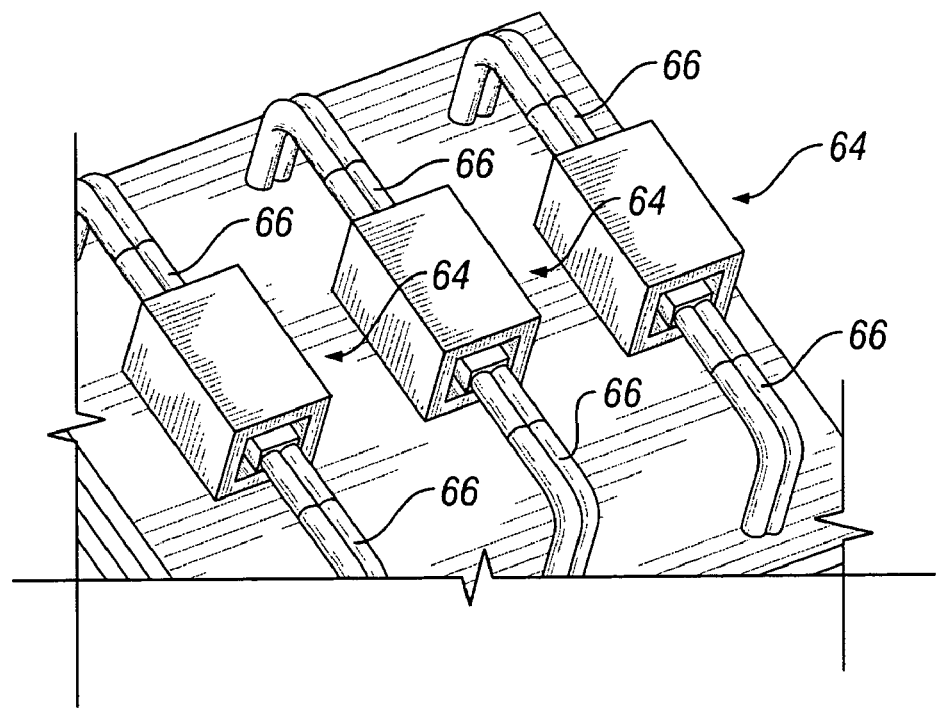
FIG. 6B shows a portion of a heat sink in accordance with an embodiment of the present invention.
Figure 6C:
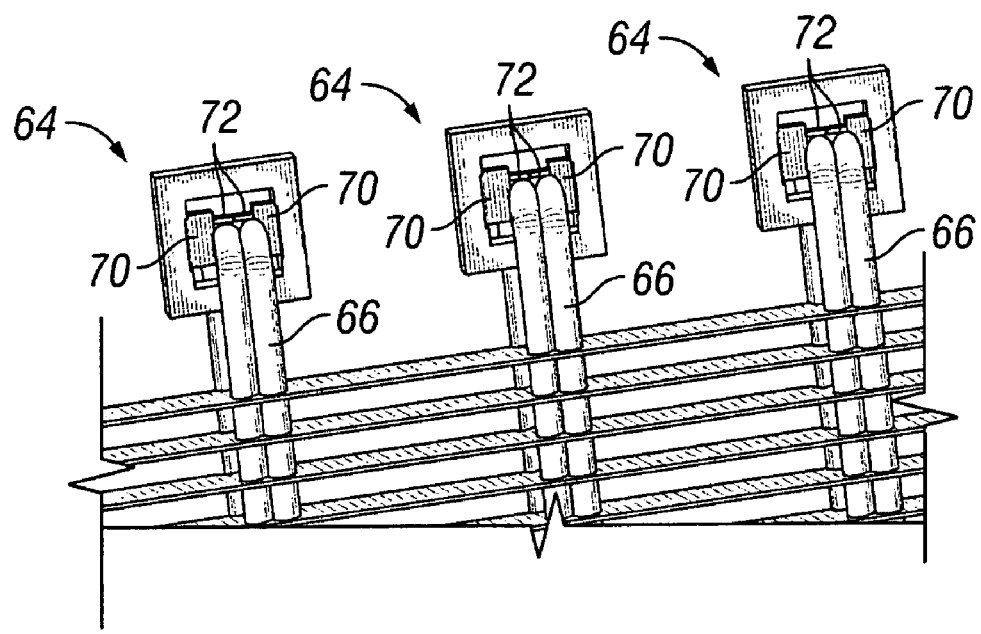
FIG. 6C shows a portion of a heat sink in accordance with an embodiment of the present invention.

FIGS. 6A, 6B, and 6C show a portion of heat sink 60 in accordance with an embodiment of the present invention. Particularly, FIGS. 6A and 6C show an exemplary pump assembly 64. The pump assembly 64 is at least partially formed of a ferromagnetic metal piece 74 that is connected to magnets 70 that are disposed on opposite sides of pipe 66. The magnets 70 are arranged such that a magnetic field is induced between the magnets 70 across the pipe 66. For example, in one or more embodiments of the present invention, a north pole of a magnet 70 disposed on one side of the pipe 66 faces the pipe 66, while a south pole of a magnet 70 disposed on an opposing side of the pipe 66 faces the pipe 66.

In one or more embodiments of the present invention, the ferromagnetic metal piece 74 may be formed of, for example, iron, nickel, and/or cobalt. Further, in one or more embodiments of the present invention, the ferromagnetic metal piece 74 may be formed of a plurality of ferromagnetic metal pieces. The ferromagnetic metal piece 74 may be used to at least partially shield a magnetic field generated using magnets 70. In one or more other embodiments of the present invention, a ferromagnetic metal piece may be implemented around a pump assembly so as to more fully shield a magnetic field induced by magnets in the pump assembly. In one or more other embodiments of the present invention, a ferromagnetic metal piece may be implemented around a plurality of pump assemblies so as to more fully shield the magnetic fields induced in the plurality of pump assemblies.

At least the portions of pipe 66 residing in the pump assembly 64 may be electrically non-conductive. Electrically conductive metal pieces 72 are positioned along portions of each of the two pipes forming pipe 66. Although FIGS. 6A and 6C show only one electrically conductive metal piece 72 positioned along a portion of each of the two pipes forming pipe 66, additional electrically conductive metal pieces (not shown) may be respectively positioned along another portion of each of the two pipes forming pipe 66.

In one or more embodiments of the present invention, a voltage is applied across electrically conductive metal pieces disposed on either side of the pipes forming pipe 66, thereby causing one of the electrically conductive metal pieces to have a higher voltage than the other, which, in turn, causes electrical current flow between electrically conductive metal pieces and through electrically conductive fluid flowing in pipe 66.

In one or more embodiments of the present invention, an electrically conductive metal piece disposed along a portion of a side of a pipe forming pipe 66 may be, for example, copper foil.

Figure 7A:
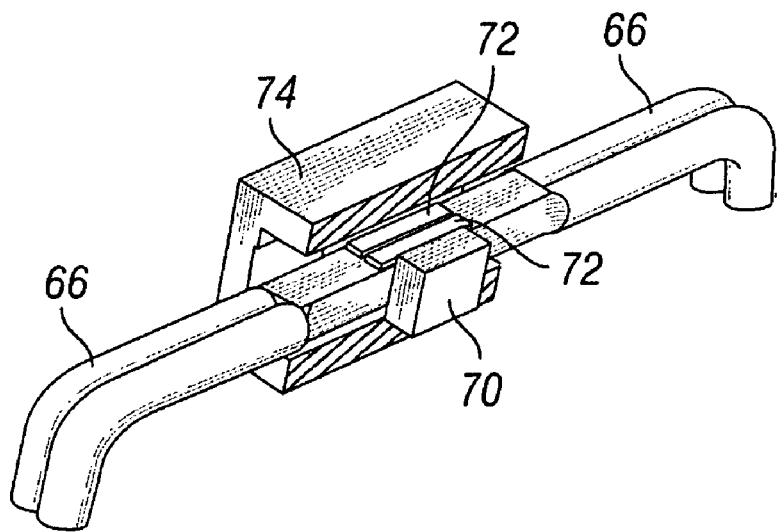
FIG. 7A shows a portion of a heat sink in accordance with an embodiment of the present invention.
Figure 7B:
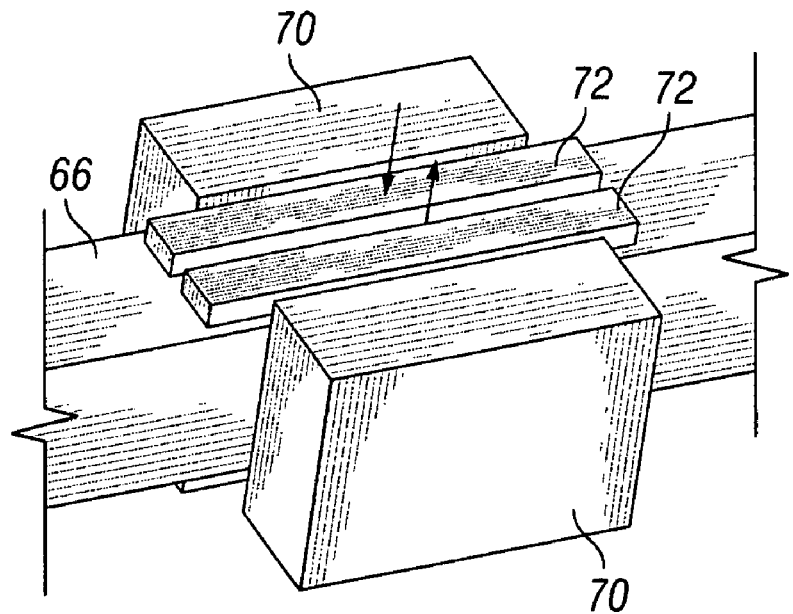
FIG. 7B shows a portion of a heat sink in accordance with an embodiment of the present invention.
Figure 7C:
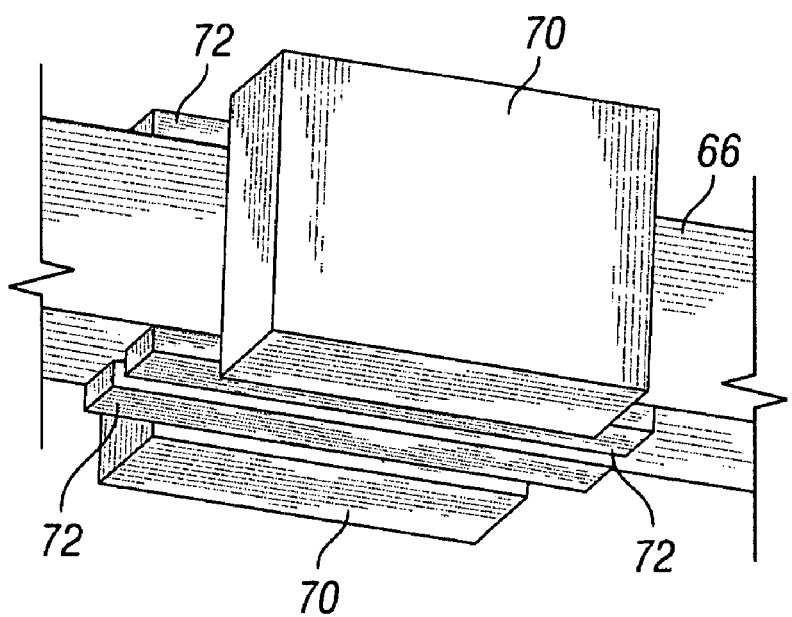
FIG. 7C shows a portion of a heat sink in accordance with an embodiment of the present invention.

FIG. 7A shows a portion of heat sink 60 in accordance with an embodiment of the present invention. The direction of fluid flow in pipe 66 is controlled by the orientation and polarities of magnets 70 and electrically conductive metal pieces 72 disposed in pump assembly 64. Particularly, FIG. 7A shows a cut-away view of pump assembly 64. Electrically conductive metal pieces 72 may be positioned along top portions of the pipes forming pipe 66 as shown in FIG. 7B. Electrically conductive metal pieces 72 may also be positioned along bottom portions of the pipes forming pipe 66 as shown in FIG. 7C. Those skilled in the art will note that the portions of pipe 66 along with electrically conductive metal pieces 72 are disposed may be electrically non-conductive.

Figure 8:
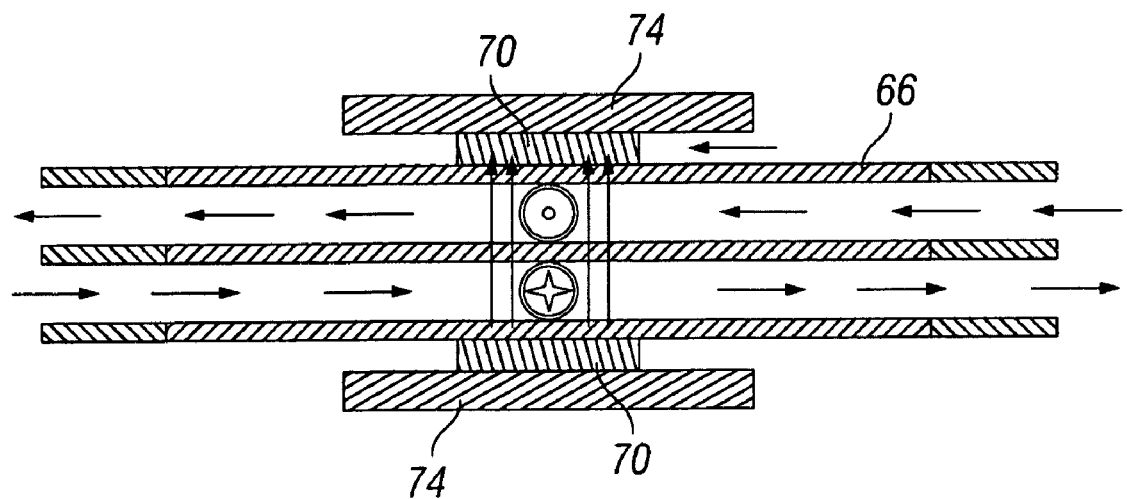
FIG. 8 shows a portion of a heat sink in accordance with an embodiment of the present invention.

FIG. 8 shows a portion of heat sink 60 in accordance with an embodiment of the present invention. Particularly, FIG. 8 shows fluid flow (indicated by arrows) in the pipes forming pipe 66. A magnetic field, linear in direction, is induced across pipe 66 by magnets 70 (magnetic field direction indicated by arrows). Through use of the electrically conductive metal pieces (not shown) disposed along portions of the pipes forming pipe 66, current flow is induced across the electrically conductive fluid flowing in pipe 66.

Current is applied to the electrically conductive metal pieces (not shown) such that for one of the pipes forming pipe 66, current flows out of the plane of the drawing shown in FIG. 8, and for the other of the pipes forming pipe 66, current flows into the plane of the drawing shown in FIG. 8. In such a manner, due to general physics principles known to those skilled in the art, fluid in one of the pipes forming pipe 66 flows in an opposite direction to the flow of fluid in the other of the pipes forming pipe 66. Such fluid flow (indicated by arrows) can also be seen in FIG. 9.

Figure 9:
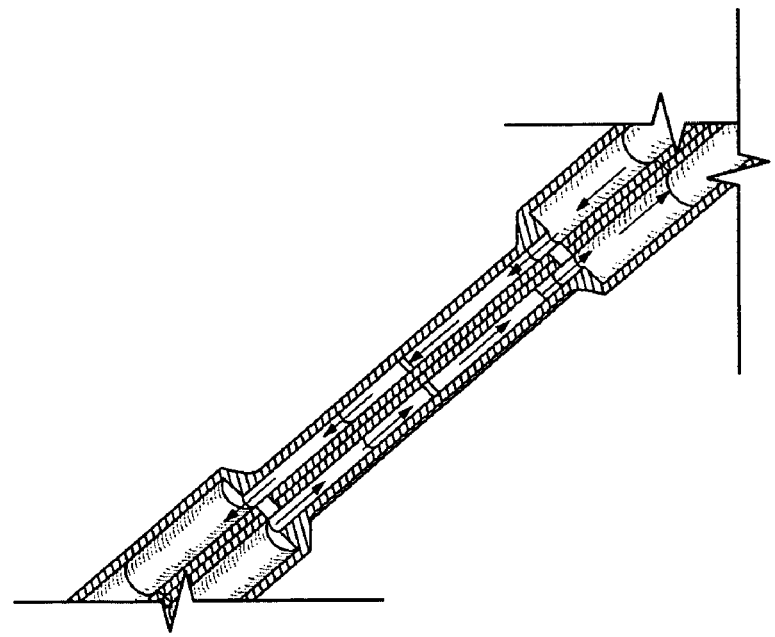
FIG. 9 shows a portion of a heat sink in accordance with an embodiment of the present invention.

Those skilled in the art will note that in one or more other embodiments of the present invention, the directions of fluid flow in pipe 66 as shown in FIGS. 8 and 9 may be reversed by (i) changing the orientation of the poles of magnets 70 and/or (ii) changing the direction of electrical current flow induced between the electrically conductive metal pieces disposed along portions of pipe 66.

Further, those skilled in the art will note that the rate of fluid flow in pipe 66 may be adjusted by (i) adjusting the strength of magnets 70 and/or (ii) adjusting the magnitude of electrical current flow between the electrically conductive metal pieces disposed along portions of pipe 66.

By controlling fluid flow direction and rate as shown and described with reference to FIGS. 8 and 9, a pump assembly 64 draws "heated" liquid away from a heat source and directs "cooled" liquid toward the heat source. More specifically, liquid near a heat source attached along a bottom of heat sink 60 is heated by the heat source and then drawn away from the heat source through the heat sink 60 by a pump assembly 64. As the "heated" liquid is propagated through the heat sink 60, heat is dissipated via, for example, heat sink fins 62. In other words, the fluid in heat sink 60 is thermally conductive, and accordingly, absorbs heat generated by the heat source and dissipates the heat to outside air via, for example, heat sink fins 62. This liquid, which has now dissipated heat absorbed previously from the heat source, is then re-circulated back through the heat sink 60 to the heat source by the pump assembly 64 for further "cooling" of the heat source.

Figure 10:
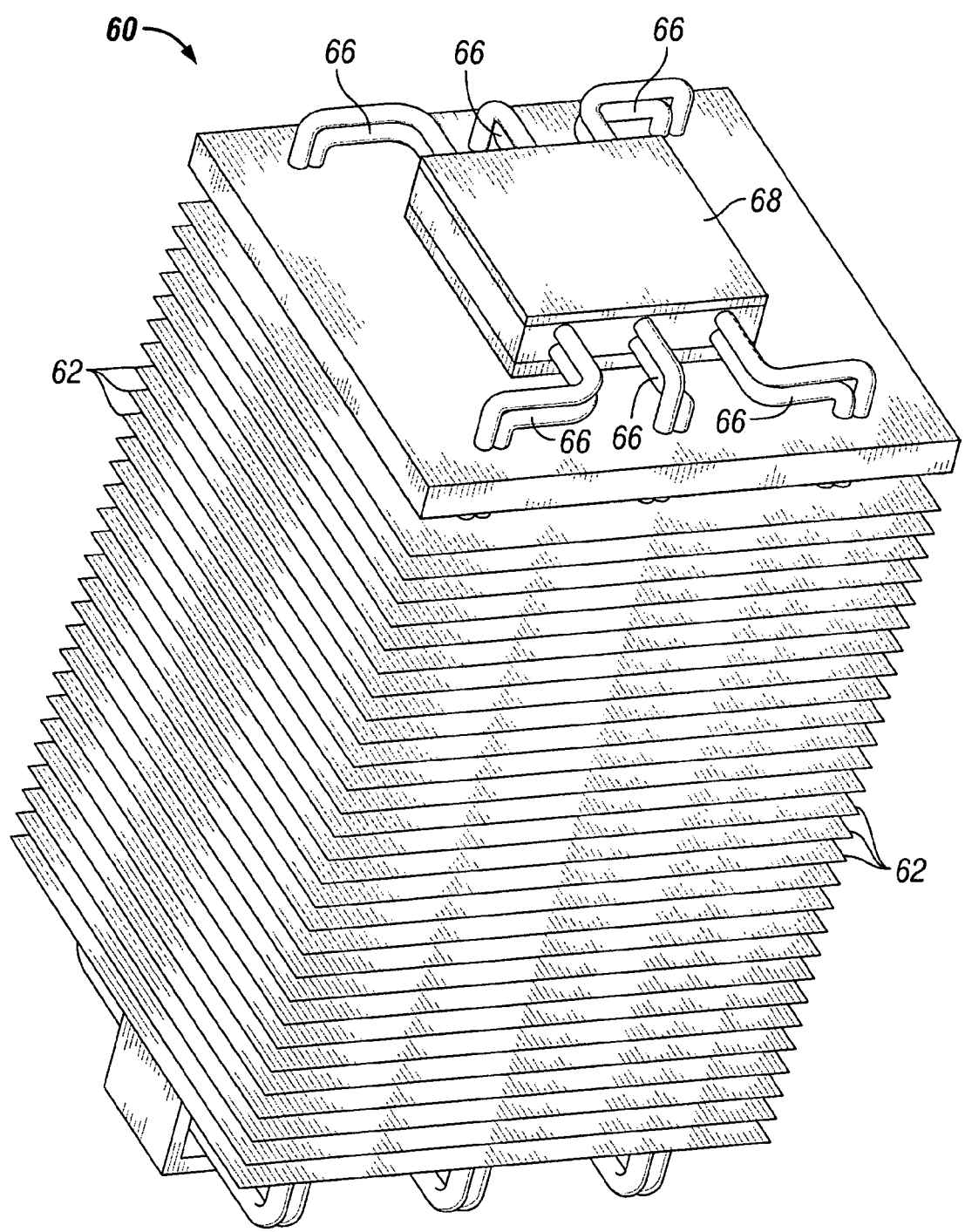
FIG. 10 shows a bottom view of a heat sink in accordance with an embodiment of the present invention.

FIG. 10 shows a bottom view of heat sink 60 in accordance with an embodiment of the present invention. Particularly, FIG. 10 shows that heat exchanger assembly 68 is attached to the bottom of heat sink 60. In one or more embodiments of the present invention, the heat exchanger assembly 68 may be formed of copper.

Figure 11A:
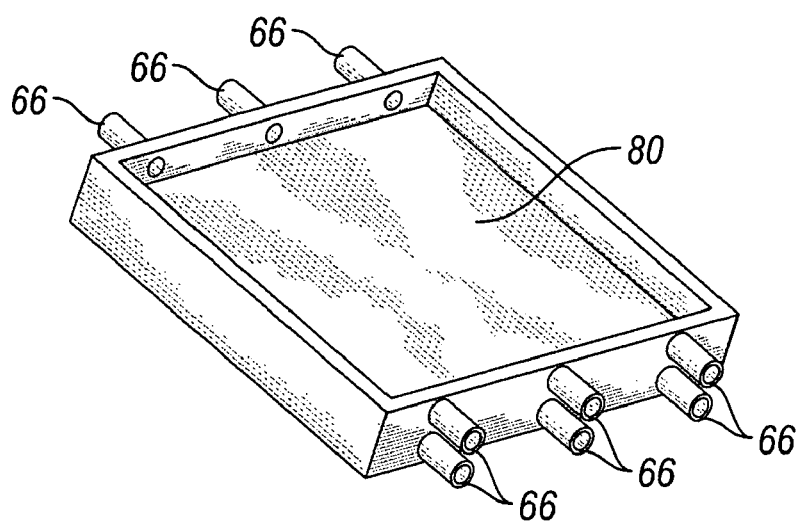
FIG. 11A shows a portion of a heat sink in accordance with an embodiment of the present invention.
Figure 11B:
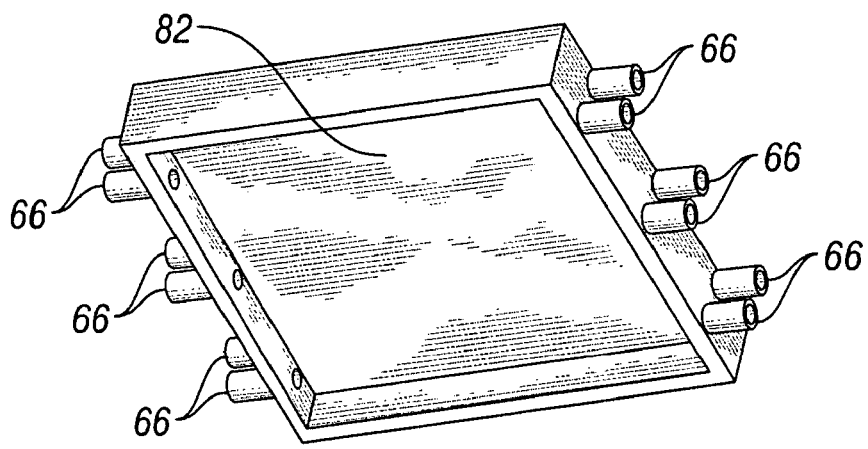
FIG. 11B shows a portion of a heat sink in accordance with an embodiment of the present invention.

In one or more embodiments of the present invention, the heat exchanger assembly 68 is formed of two cavities. A bottom cavity 80 is shown in FIG. 11A, and a top cavity 82 is shown in FIG. 11B. Pipes forming the pipes 66 are connected to one of the two cavities 80, 82.

Figure 12:
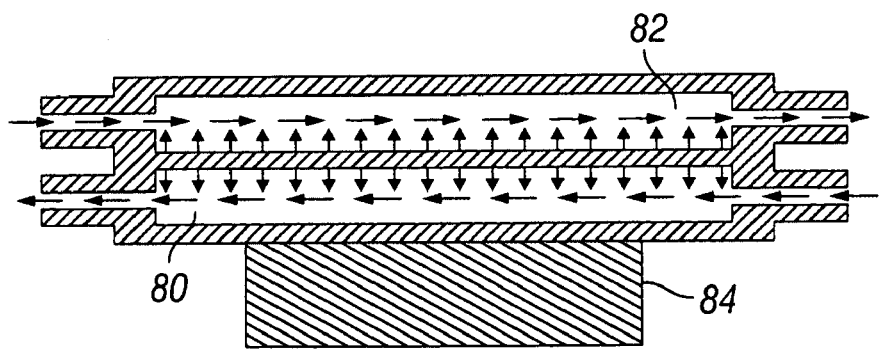
FIG. 12 shows a portion of a heat sink in accordance with an embodiment of the present invention.

Each of the cavities 80, 82 handles fluid flow in one direction as shown, for example, in FIG. 12. In FIG. 12, fluid in cavity 82 flows from left to right (indicated by arrows), and fluid in cavity 80 flows from right to left (indicated by arrows). Further, heat transfer (indicated by arrows) occurs between the fluid in cavities 80, 82, thereby propagating heat away from a heat source 84 to fluid that carries the heat through the heat sink 60.

Advantages of the present invention may include one or more of the following. In one or more embodiments of the present invention, because a heat sink uses a pump assembly that generates a magnetic field to drive fluid flow within the heat sink, the fluid flow rate may be increased, thereby resulting in increased heat transfer from a heat source to heat sink fins that dissipate heat to outside air.

In one or more embodiments of the present invention, a heat sink pump assembly for generating a magnetic field to drive fluid flow within the heat sink is at least partially shielded.

In one or more embodiments of the present invention, a heat sink uses a pump assembly for generating a magnetic field to induce particular fluid flow, where "cooled" fluid is directed toward a heat source and "heated" liquid is directed away from the heat source, thereby resulting in a "cooling" of the heat source.

In one or more embodiments of the present invention, a heat sink pump assembly for generating a magnetic field to drive fluid flow within the heat sink is rectangular and compact in design.

In one or more embodiments of the present invention, fluid flow within a heat sink may be easily changed so as to reverse the direction of fluid flow.

In one or more embodiments of the present invention, fluid flow within a heat sink may be reversed by changing the direction of electrical current induced in a pump assembly through which the fluid flows.

In one or more embodiments of the present invention, fluid flow within a heat sink may be reversed by changing the orientation of poles of magnets in a pump assembly though which the fluid flows.

In one or more embodiments of the present invention, a plurality of pump assemblies of a heat sink use separate magnetic fields, thereby providing the ability for particularly controlling fluid flow rates.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system, comprising:
    an integrated circuit;
    a heat sink operatively connected to the integrated circuit, the heat sink comprising:
        a first pipe arranged to carry thermally and electrically conductive fluid through the heat sink,
        a second pipe arranged to carry the fluid through the heat sink, and
        a pump assembly arranged to house at least a portion of each of the first pipe and the second pipe, wherein a direction of fluid flow in the first pipe and a direction of fluid flow in the second pipe is dependent on electrical current induced through a magnetic field having the same direction across the at least a portion of each of the first pipe and the second pipe.

2. The computer system of claim 1, wherein at least a portion of the first pipe and at least a portion of the second pipe are bonded together.

3. The computer system of claim 1, wherein at least a portion of the first pipe in the pump assembly and at least a portion of the second pipe in the pump assembly are electrically non-conductive.

4. The computer system of claim 1, the heat sink further comprising:
    a heat exchanger assembly operatively connected to the first pipe and the second pipe.

5. The computer system of claim 4, wherein the heat exchanger assembly is disposed along a bottom portion of the heat sink.

6. The computer system of claim 4, wherein the heat exchanger is arranged to attach to the integrated circuit.

7. The computer system of claim 4, the heat exchanger assembly comprising:
    a first cavity arranged to channel fluid in a first direction, the first cavity being operatively connected to the first pipe; and
    a second cavity arranged to channel fluid in a second direction, the second cavity being operatively connected to the second pipe.

8. The computer system of claim 7, wherein the first direction is opposite to the second direction.

9. The computer system of claim 1, wherein the pump assembly is disposed over a top portion of the heat sink.

10. The computer system of claim 1, wherein fluid flow in the first pipe is opposite in direction to fluid flow in the second pipe dependent on the magnetic field.

11. The computer system of claim 1, the pump assembly comprising:
    a ferromagnetic metal piece arranged to at least partially shield the magnetic field;
    a first magnet attached to the ferromagnetic metal piece; and
    a second magnet attached to the ferromagnetic metal piece,
    wherein the magnetic field is induced by the first magnet and the second magnet.

12. The computer system of claim 1, the pump assembly comprising:
    a first electrically conductive metal piece disposed along a portion of the first pipe residing in the pump assembly; and
    a second electrically conductive metal piece disposed along another portion of the first pipe residing in the pump assembly.

13. The computer system of claim 12, wherein current flow is induced between the first electrically conductive metal piece and the second electrically conductive metal piece.

14. A method of cooling an integrated circuit with a heat sink, comprising:
    generating a magnetic field;
    propagating thermally and electrically conductive fluid through the heat sink and the magnetic field with a first pipe;
    propagating the fluid through the heat sink and the magnetic field with a second pipe; and
    inducing electrical current through the magnetic field,
    wherein a direction of the magnetic field is the same across fluid in at least a portion of each of the first pipe and the second pipe,
    wherein a direction of fluid flow in the first pipe and a direction of fluid flow in the second pipe is dependent on the inducing and the generating.

15. The method of claim 14, further comprising:
    at least partially shielding the generating.

16. The method of claim 14, further comprising:
    adjusting a rate of fluid flow in at least one of the first pipe and the second pipe, the adjusting comprising at least one of adjusting the generating and adjusting the inducing.

17. A heat sink, comprising:
    a body having a plurality of fins arranged to dissipate heat;
    a pump assembly disposed over a top surface of the body, the pump assembly arranged to generate a magnetic field;
    a first pipe arranged to carry thermally and electrically conductive fluid through the heat sink, a portion of the first pipe being partially housed in the pump assembly;
    a second pipe arranged to carry the fluid through the heat sink, a portion of the second pipe being partially housed in the pump assembly, wherein a direction of the magnetic field is the same across the portion of the first pipe and the portion of the second pipe; and
    a heat exchanger assembly disposed along a bottom surface of the body, the heat exchanger assembly being operatively connected to the first pipe and the second pipe.

18. The heat sink of claim 17, the pump assembly comprising:
    a first magnet; and
    a second magnet, wherein the magnetic field is induced between the first magnet and the second magnet.

19. The heat sink of claim 17, the pump assembly comprising:
   a first electrically conductive piece disposed along a first non-electrically conductive portion of the first pipe partially housed in the pump assembly; and
   a second electrically conductive piece disposed along a second non-electrically portion of the first pipe partially housed in the pump assembly.

20. The heat sink of claim 19, wherein a direction of fluid flow in the first pipe and a direction of fluid flow in the second pipe is dependent on electrical current induced between the first electrically conductive piece and the second electrically conductive piece through the magnetic field.

* * * * *